Aug. 4, 1942.  M. A. BOSTWICK  2,291,684
NETWORK DISTRIBUTION SYSTEM
Filed Aug. 11, 1939  2 Sheets-Sheet 1
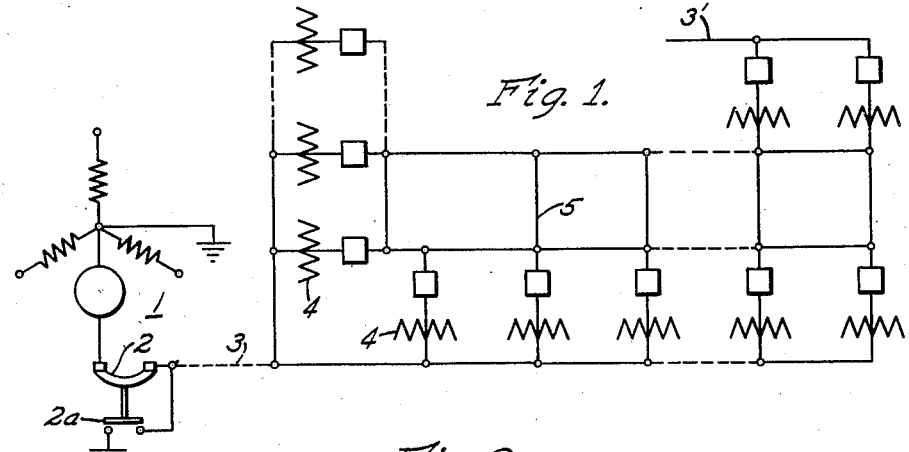
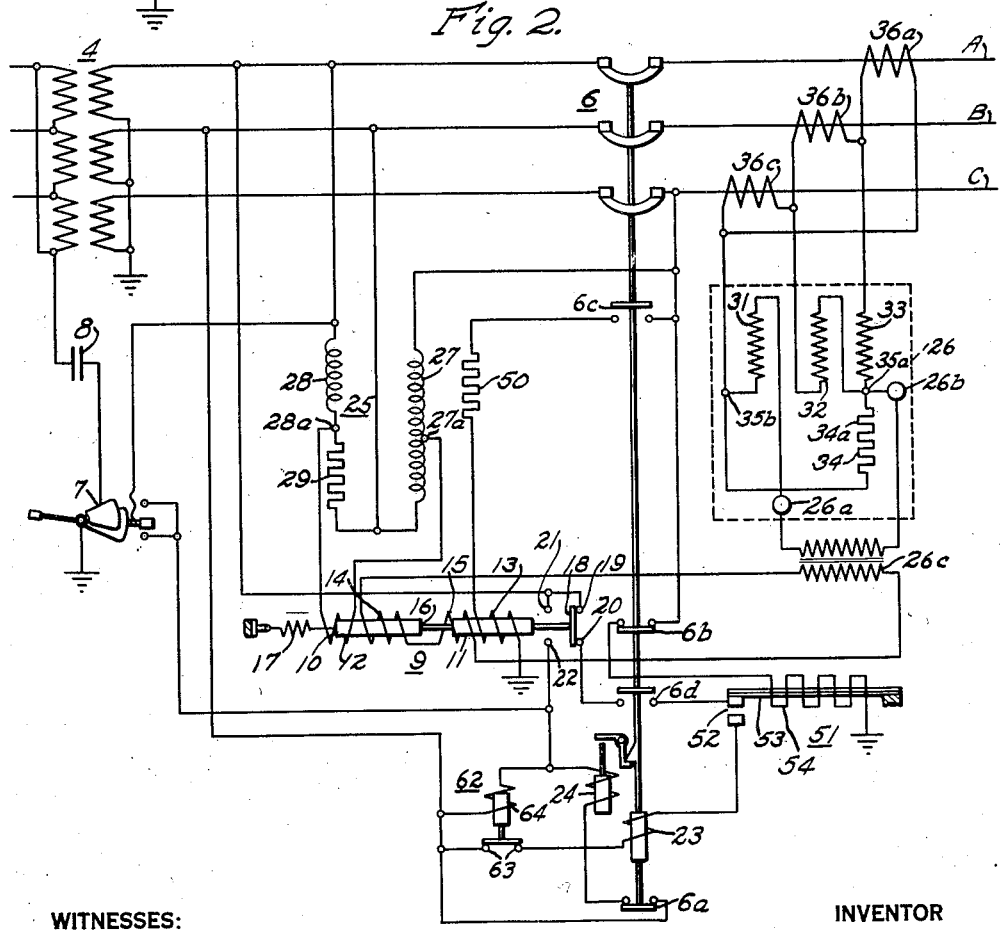
WITNESSES:  INVENTOR
Leon M. Garman  Myron A. Bostwick.
C. L. Freedman  BY
ATTORNEY Aug. 4, 1942.   M. A. BOSTWICK   2,291,684
NETWORK DISTRIBUTION SYSTEM
Filed Aug. 11, 1939   2 Sheets-Sheet 2
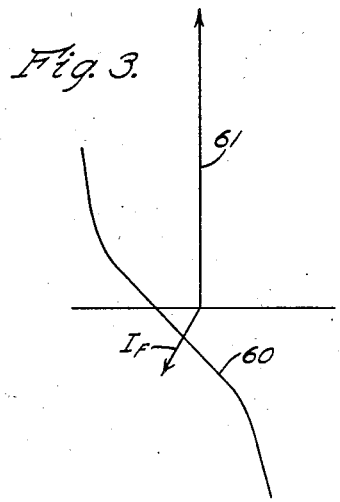
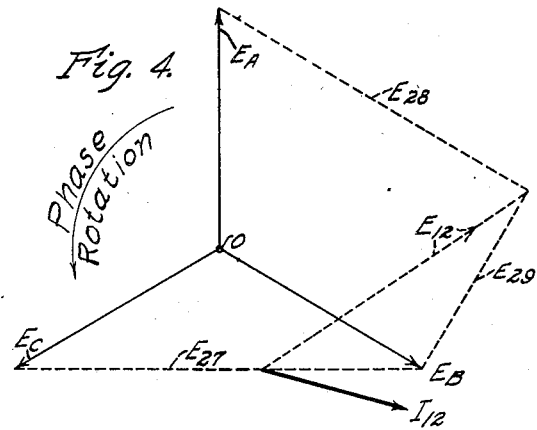
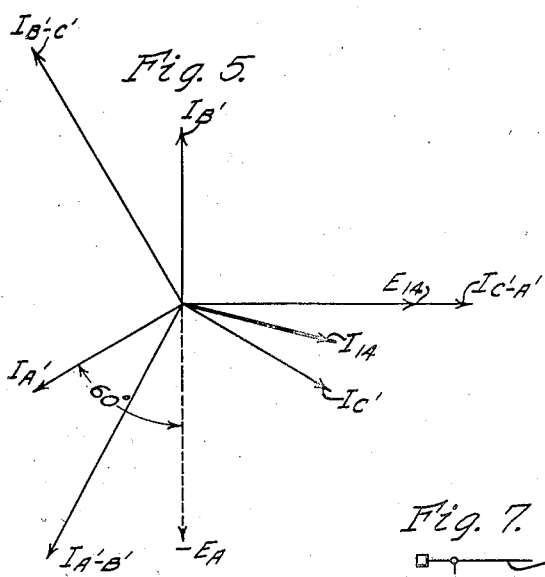
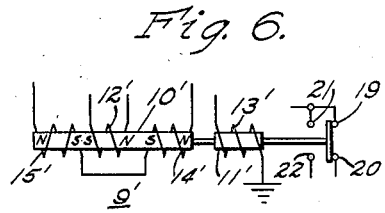
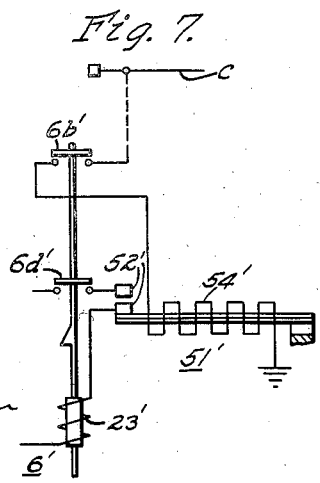
WITNESSES:
Leon M. Garman
C. L. Freedman
INVENTOR
Myron A. Bostwick.
BY
ATTORNEY Patented Aug. 4, 1942

2,291,684

UNITED STATES PATENT OFFICE 2,291,684

NETWORK DISTRIBUTION SYSTEM

Myron A. Bostwick, Budd Lake, N. J., assignor to Westinghouse Electric & Manufacturing Company, East Pittsburgh, Pa., a corporation of Pennsylvania Application August 11, 1939, Serial No. 289,513

17 Claims. (Cl. 175—294)

My invention relates to alternating current systems of distribution, and particularly to such systems of the network type. In network systems, a distribution network is supplied by means of a plurality of feeders through step-down transformers from one or more supply sources. The flow of power between the step-down transformers and the network is controlled by means of automatic switches known as network protectors.

It has heretofore been the practice in such systems to provide power directional relay apparatus for causing the network switches to trip open in response to a reverse power flow from the network to the feeder, and to cause the network switch to reclose when the voltage on the feeder side is higher than the voltage on the network side and bears such a phase relationship thereto as to cause power to flow from the feeder to the network immediately after closure of the network switch.

The latter operation of comparing the voltages on the feeder and on the network sides of the network switch is termed "phasing," and serves the following two purposes. First, the phasing operation prevents closure of the network switch, if, in repairing a feeder fault, any two conductors of the feeder have been transposed, or if all three feeder conductors have been rotated 120° or 240°. Second, the phasing operation serves to prevent repeated opening and closing or "pumping" of the network switch in the event that the relationship of voltages on the feeder side and on the network side of the switch is such as to cause power flow from the network to the feeder when the switch is closed, and closure of the switch when the latter is open.

However, the second function cannot always be performed perfectly by a single network relay, and at many locations in the network it is necessary to provide the protectors with additional phasing relays to prevent pumping. Even when equipped with such phasing relays, many unnecessary operations of the network protectors occur because of reverse power flow at various points in the network, following the ordinary laws of power distribution through a network.

One object of my invention is to provide a novel network protector which shall be controlled to open when the feeder is faulty, or when the main breaker of the feeder at the station source is opened to disconnect the feeder circuit entirely at times of light load and an artificial ground fault is placed on the feeder to open the network circuit breakers connected to the feeder.

Another object of my invention is to provide a network protector which shall be controlled to remain closed during normal conditions regardless of the magnitude of energy flow in the forward direction, that is from the feeder to the network, but which shall open under certain limited conditions of reverse energy flow.

Another object of my invention is to provide a simplified and more economical network system in which a simple form of electro-responsive apparatus is provided to determine whether the network shall continue closed or whether it shall be opened to disconnect the feeder and the network. As part of the simplified control apparatus for this network system, I employ a simplified phasing arrangement to supervise the closing of the network breaker when the magnitudes of the feeder and of the network voltages are approximately equal and normal and no crossed phase conditions exist in the feeder circuit.

A further object of my invention is to provide a simple system for controlling the connection of a network transformer to the network whether the network is energized or not.

In order to establish a simple control system for a network breaker, I employ a simple filter to procure a measure of the positive phase-sequence voltage and of the positive phase-sequence current and utilize those quantities to determine the direction of energy flow by means of a simple electromagnetic relay structure, and then employ the operation of that relay structure to control the permitted continued closure of the breaker, or to effect its opening upon the occurrence of abnormal conditions resulting in a reversal of energy flow.

The manner in which the system operates in accordance with the principles of my invention is illustrated in the accompanying diagrams of a network including the several elements arranged according to my invention as described herein.

Figure 1 is a simple schematic single line diagram of a network system in which one feeder supplies the network through several network protector units, Fig. 2 is a diagram showing the transformer and circuit breaker of one network protector unit together with the control equipment therefor, Fig. 3 is a simple graph illustrating the operating areas within which the system functions to control the circuit breaker according to the direction of energy flow.

Fig. 4 is a vector diagram showing voltage and current conditions in a phase sequence voltage filter employed in Fig. 2, Fig. 5 is a vector diagram showing current and voltage conditions in a phase sequence current filter employed in Fig. 2, Fig. 6 is a diagrammatic view of a modified relay suitable for the circuit of Fig. 2, and Fig. 7 is a diagrammatic view of a modified thermal relay suitable for the circuit of Fig. 2.

As shown in the diagram, referring to Fig. 1, a grounded neutral polyphase medium voltage source 1 is connected by means of a feeder circuit breaker 2 to a feeder circuit 3. Suitable apparatus, shown diagrammatically as back contacts 2a of the feeder breaker 2, is provided for grounding one conductor of the feeder 3 whenever the feeder breaker 2 is open, whether due to a fault on the feeder, or due to intentional manual opening to deenergize the feeder at time of light load on the network. This automatic ground may be omitted, but if omitted, a manually operated ground would be provided for one phase conductor at the source end of the feeder for permitting manual deenergization of the feeder. The feeder breaker 2 is provided with the fault-responsive apparatus, for causing it to open in response to a fault on the feeder 3. As such apparatus forms no part of the present invention and is well-known in the art, it has not been shown in the drawing.

At each network protector unit, as in Fig. 2, a step-down transformer bank 4 is connected between the feeder 3 and a low-voltage distribution network 5. The transformer bank 4 is preferably connected with its high-voltage windings in delta and its low-voltage windings in star with neutral grounded, but other arrangements familiar to those skilled in the art may be used. The high-voltage windings of the transformer bank 4 are shown ungrounded. Although, for simplicity, only two feeders 3 and 3' are shown in Fig. 1, it will be understood that the network 5 is or may be supplied by any number of feeders, and that each feeder is similarly connected to the network 5 by means of a plurality of transformer banks in accordance with the usual practice indicated in Fig. 1.

A network protector for each transformer bank 4 comprises a network circuit breaker 6 and its associated control apparatus which is provided for controlling the flow of power from the transformer bank 4 to the network 5. In accordance with my invention, any suitable apparatus responsive to a ground fault on the feeder 3 is provided for tripping open the network circuit breaker 6. This ground-responsive apparatus is shown as an electro-static relay 7 connected to the high-voltage terminals of the transformers 4 by means of a capacitor 8. The relay 7 is preferably provided with front and back contacts, and is designed to float between the contacts normally, but to engage one set of its contacts in response to a ground on any single conductor of the feeder 3.

Upon the occurrence of a ground on one conductor of the feeder, the voltage to ground of the two ungrounded conductors rises approximately to 173% of normal voltage. The front contacts of the relay 7 may be adjusted to close when the voltage across the relay rises above a predetermined voltage as above 140% of normal voltage. The back contacts of the relay 7 close when a ground occurs on or is applied to the conductor to which the relay is connected, or in response to a drop in voltage across the relay to or below a predetermined voltage such as 30% of normal voltage. These values will depend on the characteristics of each system to which the relay is applied. Actually the 140% setting may be reduced to say 120 to 130% and the 30% setting to 50 or 60%. These limits to be determined by the change in feeder voltage that results from network faults. The relay shall not operate when the network is faulted. When the ground relay engages either set of contacts, it completes the tripping circuit to the trip coil 24 of the network breaker through an auxiliary contact 6a on that breaker which is closed when the breaker is closed.

An electromagnetic relay 9 is provided to control the closure of the network circuit breaker 6, or to open the breaker, according to the direction of energy flow between the transformer and the network. The relay 9 comprises two electromagnetic core armatures 10 and 11, which are respectively provided with voltage windings or coils 12 and 13 and current windings or coils 14 and 15. The two cores are secured together by an element diagrammatically illustrated as a mechanical connection 16, and an adjustable biasing spring 17 is provided to impart an initial bias to the two cores. Although for some applications the bias may be such that the movable contact is biased towards the contacts 21 and 22, usually the bias is in a direction corresponding to the forward direction of the relay. In that direction the relay operates a movable contact 18 to engage and to complete a circuit between two stationary contacts 19 and 20. In the reverse direction the movable contact engages and completes a circuit between two stationary contacts 21 and 22. The contacts 19 and 20 are provided to control the circuit to the closing coil 23 of the breaker 6, and the contacts 21 and 22 are provided to control the circuit of the tripping coil 24 of the breaker.

The core 10 of relay 9 is so disposed with respect to its windings 12 and 14 that those windings will tend, when normally energized, to move the core, and, consequently, the movable contact 18, to engage the contacts 19 and 20 to the closing circuit. The core 11 is so disposed that energization of its windings will tend to move the core 11 and the movable contact member 18 toward the left to engage the contacts 21 and 22 to complete the circuit to the trip coil of the breaker.

In order to provide energization for the directional relay 9, a positive phase sequence voltage filter 25 and a positive phase-sequence current filter 26 are provided.

The phase-sequence voltage filter 25 is preferably of the type disclosed in the U. S. patent to B. E. Lenehan No. 1,936,797, issued November 28, 1933, and assigned to the Westinghouse Electric & Manufacturing Company. The voltage filter 25 comprises as one arm, an auto-transformer 27 having a tap 27a to provide a voltage less than half of the total voltage impressed on the auto-transformer as, for example, a 40% tap, and the filter further comprises, as the other arm, a reactor 28 and a resistor 29. Reactor 28 and the resistor 29 are proportioned to produce together a 40% voltage drop across the resistor lagging the impressed voltage across the combined reactor and resistor by an angle of 60°. The three elements 27, 28 and 29 are connected, as illustrated, with the reactor 28 and the resistor 29 constituting one arm of the filter connected between phase A and B on the transformer side of the switch, and the auto-transformer 27 constituting alone the other arm of the filter and connected between phase conductor B on the transformer side of the switch 6 and phase conductor C on the network side of the network switch.

With the phase rotation of the voltages of the transformer and of the network A—B—C, as indicated by the subscripts applied to the conductors of the network 5, the voltage derived between the tap 27a, of the auto-transformer 27, and the juncture point 28a, between the reactor 28 and resistor 29, will be proportional to a positive phase-sequence voltage component of the polyphase system voltage applied to the phase-sequence filter 25. The voltage coil 12 for the core 10 of the directional relay 9 is connected between the two points 27a and 28a, and is therefore energized in accordance with that positive symmetrical voltage component.

The phase sequence filter 26 preferably is of the type disclosed in an application Serial No. 187,510, filed January 27, 1938, by Bernard E. Lenehan, and assigned to the Westinghouse Electric & Manufacturing Company, the filter being designed and energized to assure proper phase relationships between the electrical quantities derived from it and the remaining portions of the protector circuit as hereinafter described. This application is now Patent No. 2,161,829.

As illustrated in Fig. 2, the filter 26 includes three reactors 31, 32, 33 which are energized from three current transformers 36a, 36b and 36c connected in delta. These reactors are mutually coupled together, the reactors 32 and 33 constituting series-connected primary windings for the reactor 31 which constitutes a secondary winding. Polarity markings + are applied to the reactors in order to facilitate the tracing of their connections to the delta-connected current transformers. Completing the filter, a resistor 34 is connected between a tap 35a, which is in the series connection between the two primary reactors 32, 33 and a tap 35b, which is on the conductor extending from the primary reactor 31 to the current transformers. The output from the filter is derived from a terminal 26a, which is connected to the primary reactor 31, and a terminal 26b, which is connected to the tap 35a.

In order to provide an output controlled by the positive sequence current flowing in the network, the elements of the filter 26 bear predetermined relationships to each other. If the resistor 34 is assumed to have a resistance of the value R, then the value of the mutual inductance between the secondary reactor 31 and each primary reactor 32 or 33 is made equal to $$j\frac{R}{\sqrt{3}}$$

With these values of resistance and inductance, the desired filtering action is obtained as described more particularly in the aforesaid Lenehan application.

It should be noted that in the Lenehan application, the current transformers corresponding to applicant's current transformers 36a, 36b, 36c are connected in Y with the neutral connected to a tap on the resistor 34 at a point 34a which places one-third of the resistance 34 between the taps 34a and 35a. The purpose of this connection of the neutral is to assure proper control of any zero-sequence current component which may be present because of the Y connection of the current transformers. In the filter of Fig. 2, the delta connection of the current transformers eliminates the zero-sequence component. With this exception, the theory presented in the aforesaid Lenehan application is applicable to the filter herein described.

Under some conditions it may be desirable to restrict the maximum current supplied to the coils 14 and 15 from the filter 26. This may be accomplished readily by inserting a transformer 26c between the output of the filter 26 and the coils 14 and 15. The transformer 26c is designed to saturate when the output of the filter 26 reaches a predetermined value. This would render the voltage coil 12 effective for polarizing the relay 9 at lower values of voltage.

The current coil 14 of core 10 and the current coil 15 of current coil 11 are connected in series to the positive phase-sequence current filter 26. The winding 13 on the core 11 is connected through a suitable resistor 50 to one conductor of the network to provide a phase-to-neutral voltage for the winding 13.

Under normal conditions, with the circuit breaker 6 open and the transformer 4 disconnected from the network 5, and upon energization of the feeder 3, with the feeder sound and free of faults, the voltage phase sequence filter 25 will be properly energized to supply a positive phase sequence voltage component to the winding 12 of the core 10 of the directional relay 9. Current windings on both cores will not be energized but winding 13 will be energized according to the network voltage. Under such conditions, the relay 9 is designed to permit the winding 12 to operate its core 10 against the restraining action of the voltage winding 13 on its core 11. The relay 9 will thereupon be operated to close the circuit between contacts 19 and 20 which will complete the circuit to the closing coil of the breaker 6.

A cut-off circuit for the closing coil is shown by way of example as a thermal relay device 51, including a pair of contacts 52 controlled by a bimetal arm 53 to be energized by a heating coil 54 connected to the network through an auxiliary contact switch 6b that is closed when the circuit breaker 6 is closed. After a time interval corresponding to the characteristic of the thermal relay switch 51, the contacts 52 will be opened to open the circuit of the closing coil. When the protector circuit breaker 6 is tripped it cannot be reclosed until the thermal relay switch has cooled sufficiently to close its contacts 52. The provision of this time delay in reclosing serves to reduce pumping of the circuit breaker.

The voltage filter 25 serves to provide a check on the proper voltage on the secondary side of the transformer as well as a check upon distribution or transposition of the feeder conductors in case of an intervening faulty condition which might have required opening the conductors of the feeder circuit and reconnecting them. At the same time the connection between the transformer side of the breaker and the network side of the breaker provides a phasing circuit to insure that the conductors of the feeder circuit are not transposed or rotated, and that the voltage conditions are proper between the transformer and the network.

So long as energy is fed in the proper forward direction, which is from the transformer to the network, the directional relay 9 will be biased and will be energized in its forward direction towards contacts 19 and 20. That condition generally will correspond to a condition that may be described by reference to Fig. 3 as being any condition during which the load current vector will always be above or to the right of the energy directional locus 60. The vector 61 serves as a reference vector to indicate the normal network voltage. A fault current $I_F$ is indicated in Fig. 3 which would trip the circuit breaker 6.

Under normal conditions, the effects of the two current windings in the directional relay 9 will balance out. Upon the occurrence of conditions in the transformer or in the feeder circuit causing a reversal of energy as would be indicated by the current vector $I_F$ in Fig. 3, the current winding 14 would be reversely energized in such direction to be differentially effective with respect to the voltage winding 12 on the core 10. The preponderance of pull would operate the directional relay 9 towards the left to engage the contacts 21 and 22 to complete the energizing circuit to the trip coil of the breaker.

The location and slope of the reverse energy locus 60 may be controlled by varying the constants of the energizing windings of the directional relay 9.

In the case where the network circuit is not energized through some other feeder circuit, so that it will be entirely deenergized when the feeder 3 is faulty or opened to cause the opening of all of the protector units connected to the feeder 3, the lack of energization of the restraining winding 13 on the directional relay 9 will permit the relay to be operated immediately to close the circuit to the closing coil when the main feeder breaker is closed, even though the voltage filter is not completely energized due to the lack of energization of the C phase conductor of the network. In that case the energization of the winding 12 will be aided by the biasing action of the spring 17 to bias the relay 9 in its forward direction towards the closing contacts 19 and 20.

Since the winding 13 need be energized only during the phasing or closing operation, a pallet switch 6c may be provided for disconnecting the winding 13 after the circuit breaker 6 has been closed. A similar pallet switch 6d may be employed for interrupting the closing circuit as soon as the circuit breaker is closed.

The operation of the protector circuit herein described will be more clearly understood by a consideration of the voltage and current relationships applied to the relay 9. In Fig. 4, the vectors $E_A$, $E_B$ and $E_C$ represent the phase-to-neutral positive sequence voltages of the conductors A, B and C, respectively, which are applied to the voltage filter 25. As explained in the Lenehan Patent 1,936,797, these applied voltages produce voltage drops across the auto-transformer 27, reactor 28 and resistor 29 which are represented respectively by the vectors $E_{27}$, $E_{28}$ and $E_{29}$. The output of the filter is a voltage $E_{12}$ which produces a current $I_{12}$ through the relay potential winding 12.

Referring to Fig. 5, a vector diagram is shown for a feeder fault in which the positive sequence current $I_{A'}$ lags by 60° the voltage $E_A$ reversed. This value is representative of the phase relationship commonly encountered in feeder faults. The positive sequence currents in the current transformers 36a, 36b, 36c under this condition are represented in Fig. 5 by vectors $I_{A'}$, $I_{B'}$, $I_{C'}$ respectively, and the currents supplied to the reactors 31, 32, 33 are represented by the vectors $I_{C'-A'}$, $I_{B'-C'}$ and $I_{A'-B'}$. As explained in the aforesaid Lenehan application, these currents produce an output voltage $E_{14}$ across the terminals 26a, 26b. The voltage $E_{14}$ sends a current $I_{14}$ through the relay current windings 13, 14.

It should be noted that the current $I_{12}$ of Fig. 4 is substantially in phase with the current $I_{14}$ of Fig. 5 under feeder fault conditions. These currents flow respectively in the windings 12 and 14 in such directions that their magnetomotive forces neutralize each other whereupon the relay 9 moves into tripping position. That is, the winding 15 tends to move the relay into tripping position whereas the coil 14 tends to oppose such movement. When the control exercised by the winding 14 is rendered ineffective by the energization of the winding 12 under fault conditions, the protector circuit breaker 6 is tripped. The neutralization effected by the windings 14 and 12 occurs only when current is flowing from the network to the feeder.

Recapitulating, the circuit breaker 6 is tripped on ground faults occurring on any of the feeder conductors by operation of the relay 7. A feeder ground fault lowers the voltage across the relay 7 below 30% or raises it above 140% of normal phase-to-neutral voltage, depending on which phase conductor is faulted, and the relay consequently closes either its back or front contacts to trip the circuit breaker 6. Preferably the relay 7 has a time delay, such as one second, in either direction or for undervoltage tripping alone, in order to prevent tripping of circuit protectors on sound feeders when a fault occurs on another feeder. Normally, of course, the movable contact of the relay 7 floats between the front and back contacts without engaging either.

Upon current flow from the network to the feeder, as when a two or three phase fault occurs on the feeder, the winding 14 is energized from the current filter 26 in proper phase relationship to neutralize the magnetomotive force of the winding 12, and the winding 15 thereupon moves the relay from contact with the closing contacts 19, 20 into tripping contact with the contacts 21, 22.

After any tripping operation, the protector breaker does not reclose until the thermal relay 51 has cooled sufficiently to reengage its contacts 52.

In order to permit reclosure of the circuit breaker 6, the phase rotation must be normal. If two feeder conductors are transposed during repairs, the phase rotation is reversed and the output of the voltage filter 25 is substantially reduced. This would result in insufficient energization of the winding 12 to move the relay 9 into its closing position.

If all three feeder conductors are rotated during repairs, the output of the voltage filter 25 is reduced because the energization derived from the C-onductor of the network no longer complements that supplied to the filter from the feeder side of the breaker 6. Under these conditions, the relay 9 does not move into its closing position.

Unnecessary reclosures of the network circuit breaker may be reduced under some circumstances by employing a relay 62 having back contacts 63 connected in the closing circuit of the circuit breaker. This relay has an energizing winding 64 connected in parallel with the circuit containing the trip coil 24 and the pallet switch 6a. Consequently as long as the relay 7 or relay 9 remains in tripping position, the relay 62 is energized to interrupt the closing circuit. When the relays 7 and 9 both are displaced from their tripping positions, the relay 62 is deenergized and its armature drops into bridging relationship across the contacts 63 to permit reclosing of the circuit breaker 6.

In Fig. 6 a modified construction 9' for the relay 9 is illustrated wherein the cores 10' and 11' correspond to the cores 10 and 11 of Fig. 2. A plurality of windings 12', 13', 14' and 15' correspond to the windings 12, 13, 14 and 15 respectively and are connected in the protector circuit in the same manner. It should be noted, however, that the winding 12' is placed between the windings 14' and 15' on the same core 10'. Moreover, although the windings on each core 10 and 11 of Fig. 2 may be wound with substantial mutual inductance, the windings 12', 14' and 15' of Fig. 6 are wound without substantial mutual inductance to produce during normal operation the indicated polarities. As shown in Fig. 6, the windings 12' and 15' normally oppose each other, and the winding 14' is effective for urging the relay 9' into its closing position against the closing contacts 19, 20. When the current through the windings 14' and 15' reverses because of a feeder fault, the winding 15' becomes effective for urging the relay 9' into its tripping position against the tripping contacts 21, 22.

As above indicated, the thermal relay 51 prevents a reclosure of the circuit breaker 6 for a predetermined time, which may be of the order of one to five minutes, following the tripping of the circuit breaker. When the circuit breaker is closed, this thermal relay is energized to open its normally closed contacts. If desired, the operation of the thermal relay may be modified. For example, in Fig. 7 a modified thermal relay 51' is disclosed which has contacts 52' that are normally open. This thermal relay is associated with a circuit breaker 6' which corresponds to the circuit breaker 6 except for the substitution of a pallet switch 6b' for the pallet switch 6b of Fig. 2. As shown in Fig. 7, the pallet switch 6b' is open when the circuit breaker 6' is closed, and the pallet switch 6b' is closed when the circuit breaker 6' is tripped. The pallet switch 6d', and the circuit breaker closing coil 23' are the same as the switch 6d and coil 23 of Fig. 2.

When the circuit breaker 6' is tripped, a heating coil 54' for the thermal relay is connected through the pallet switch 6b' to one phase conductor C of the network. After the lapse of a predetermined heating interval, the thermal relay closes its contacts 52' which are connected in the closing circuit for the circuit breaker. Until these contacts 52' are closed, the circuit breaker 6' cannot be reclosed.

By placing a time delay in the closing circuit, pumping of the circuit breaker is reduced without affecting the tripping circuit in any way. Upon the occurrence of a fault on the feeder, or when the feeder is to be deenergized, the tripping circuit is immediately effective for disconnecting the feeder.

Although I have described my invention with reference to certain specific embodiments thereof, it is obvious that numerous modifications thereof are possible without departing from the scope of my invention. Therefore, I do not desire my invention to be restricted except as required by the appended claims when interpreted in view of the prior art.

I claim as my invention:

1. In a polyphase electrical distribution system, a first polyphase circuit, a second circuit, a circuit breaker for connecting said circuits, means for deriving in part from said first circuit and in part from said second circuit a quantity dependent on a symmetrical phase sequence component of the energization of said circuits, means effective when said circuit breaker is open for compensating said quantity for variations resulting from a change in the energization of one of said circuits relative to the other of said circuits, circuit breaker operating means responsive to said compensated quantity, and means effective when said circuit breaker is closed for controlling the effect of said quantity on said circuit breaker operating means in accordance with the direction of energy flow in said circuit.

2. In a polyphase electrical distribution system, a first three-phase circuit, a second three-phase circuit normally energized similarly to the energization of said first three-phase circuit, a circuit breaker for connecting said circuits, means for deriving from said circuits a quantity dependent on a symmetrical phase sequence component of the energization of said circuits, said means being energized from two phase conductors of said first three-phase circuit and from a phase-conductor of said second three-phase circuit which normally corresponds to the remaining phase conductor of said first three-phase circuit, means effective only when said circuit breaker is open for opposing said quantity with a second quantity dependent on the energization of said second three-phase circuit, circuit breaker operating means responsive to the difference between said quantities, and means responsive to the direction of current flow in said circuits for controlling the effect of said first-named quantity on said circuit breaker operating means.

3. In an electrical distribution system, a plurality of electrical circuits having a predetermined flow of electrical energy, switch means for connecting said circuits, and control means for said switch means including a first current winding effective when energized for operating said control means to actuate said switch means into a disconnecting condition for disconnecting said circuits, a second current winding effective when energized for opposing said operation of said control means, said current windings being energized in accordance with a function of the current flowing in said electrical circuits, and means effective when the direction of flow of said electrical energy changes for opposing the effect of one of said current windings.

4. In an electrical distribution system, a plurality of electrical circuits having a predetermined flow of electrical energy, switch means for connecting said circuits, and control means for said switch means including a first current winding effective when energized for operating said control means to actuate said switch means into a disconnecting condition for disconnecting said circuits, a second current winding effective when energized for opposing said operation of said control means into said connecting condition, said current windings being energized in accordance with a function of the current flowing in said electrical circuits, and means effective when the direction of flow of said electrical energy changes for opposing the effect of said second current winding, said last named means including a winding energized in accordance with a voltage derived from said circuits.

5. In an electrical distribution system, a plurality of electrical polyphase circuits having a predetermined flow of electrical energy, switch means for connecting and disconnecting said circuits, a first current winding for urging said switch means into a disconnecting condition, a second current winding for urging said switch means away from said disconnecting condition, said current windings being energized in accordance with the positive sequence component of current flowing in said electrical circuits, and means responsive to the positive sequence component of a polyphase voltage present in said circuits and effective when the direction of flow of said electrical energy changes for opposing the effect of one of said current windings.

6. In a polyphase electrical distribution system, a first three-phase circuit, a second three-phase circuit, means for connecting and disconnecting said circuits, a symmetrical phase sequence voltage filter connected for energization from two phase-conductors of said first three-phase circuit and from that phase-conductor of said second three-phase circuit which is connected to the remaining phase-conductor of said first three-phase circuit through said connecting and disconnecting means, control means responsive to the difference between the output of said phase-sequence voltage filter and the energization of said second three-phase circuit when said connecting and disconnecting means is in disconnecting condition, and means effective only when the direction of current flow in said circuits through said connecting and disconnecting means changes from a predetermined direction for opposing the effect of the output of said phase sequence voltage filter on said control means.

7. In a polyphase electrical distribution system, a three-phase circuit, switch means for disconnecting two portions of said three-phase circuit, a phase sequence voltage filter having a separate terminal connected to each phase conductor of said three phase circuit, two of said terminals being connected to said three-phase circuit on one side of said switch means, and the third of said terminals being connected to said three-phase circuit on the opposite side of said switch means, closing means for said switch means, control means differentially energized from the output of said voltage filter and from the voltage between said third terminal and neutral of said three-phase circuit for controlling the energization of said closing means, means for deriving from said circuits a quantity dependent on a symmetrical current component of the same phase sequence as that of said voltage filter, and means responsive to the direction of flow of said current for opposing the effect of the output of said phase sequence voltage filter on said control means.

8. In a network distribution system, a first polyphase circuit, a second polyphase circuit, switch means for connecting and disconnecting said circuits, means for closing said switch means, means for opening said switch means, control means operable into a first condition for actuating said closing means and into a second condition for actuating said opening means, means for deriving a quantity dependent on a symmetrical phase sequence component of current flowing in said circuits, first means responsive to said quantity for actuating said control means into said first condition, second means responsive to said quantity for actuating said control means into said second condition, and means responsive to a symmetrical component of a polyphase voltage on said circuits of the same phase sequence as said current component for opposing or assisting one of said first and second means in accordance with the direction of current flow in said circuits.

9. In a polyphase electrical distribution system, a three-phase circuit, switch means for disconnecting two portions of said three phase circuit, a phase sequence voltage filter having a separate terminal connected to each phase conductor of said three-phase circuit, two of said terminals being connected to said three-phase circuit on one side of said switch means and the third of said terminals being connected to said three-phase circuit on the opposite side of said switch means, means for deriving a quantity dependent on a symmetrical component of current flowing in said circuit of the same phase sequence as that of said voltage filter, means for closing said switch means, means for opening said switch means, control means operable into a first condition for actuating said closing means and into a second condition for actuating said opening means, first means responsive to said quantity for actuating said control means into said first condition, second means responsive to said quantity for actuating said control means into said second condition, additional means responsive to the output of said voltage filter for opposing or assisting one of said first and second means in accordance with the direction of current flow in said circuit, and means responsive to a voltage of said three phase circuit on said opposite side of the switch means and effective when said switch means is open for opposing the effect of said additional means.

10. In an electrical distribution system, a polyphase circuit, switch means for dividing said polyphase circuit into a plurality of parts, and control means for said switch means operable between a first condition for closing said switch means and a second condition for opening said switch means, said control means comprising means responsive to the difference between a quantity representing the positive phase sequence current in said circuit and a quantity representing the sum of said positive phase sequence current and a symmetrical voltage component of the same sequence for operating said control means into either of said conditions.

11. In a network system, the combination with a transformer connected to a feeder circuit, and a circuit breaker to connect the transformer to the network, with closing means and tripping means for the circuit breaker, of protective means for the circuit breaker and transformer unit including ground-detector means connected to the feeder circuit on the high tension side of the transformer to energize the tripping means upon the occurrence of a ground condition on a feeder conductor, means connected to two circuit conductors on the transformer side of the breaker and to the third conductor on the network side to constitute a phasing device and a positive phase-sequence voltage filter, means connected to the network side of the circuit breaker to constitute a positive phase-sequence current filter, and means for controlling the closure of the breaker under normal energy-supplying conditions and for controlling the opening of the breaker under reverse energy conditions, said means including means energized by the sum of the positive phase-sequence voltage and of the positive phase-sequence current, and counteracting means energized by a force derived from a positive phase-sequence current.

12. In a network system, the combination with a transformer connected to a feeder circuit, and a circuit breaker to connect the transformer to the network, with closing means and tripping means for the circuit breaker, of protective means for the circuit breaker and transformer unit including ground-detector means connected to the feeder circuit on the high tension side of the transformer to energize the tripping means upon the occurrence of a ground condition on a feeder conductor, and means for controlling the closure of the breaker under normal energy-supplying conditions and for controlling the opening of the breaker under reverse energy conditions, said means including a positive phase-sequence voltage filter connected on the low voltage side of the transformer, a positive phase-sequence current filter connected to the circuit between the transformer and the network, means responsive to the sum of the phase-sequence voltage and the phase-sequence current, counteracting means responsive to the phase-sequence current, and means controlled according to the preponderating combination of voltage and current for controlling the network breaker.

13. In a network system, the combination with a transformer connected to a feeder circuit, and a circuit breaker to connect the transformer to the network, with closing means and tripping means for the circuit breaker of protective means for the circuit breaker and transformer unit including ground-detector means connected to the feeder circuit on the high tension side of the transformer to energize the tripping means upon the occurrence of a ground condition on a feeder conductor, and means connected to the low-tension side of the transformer for controlling the closure of the breaker under normal energy-delivering conditions and for controlling the opening of the breaker under reverse energy conditions, said means including means for deriving a positive phase-sequence voltage from the circuit, relay means responsive thereto, counteracting relay means responsive to the voltage of the network voltage, means for deriving a positive phase-sequence current from the circuit, and means responsive to said phase-sequence current for modifying the responsiveness of said relay and counteracting relay means.

14. A system as in claim 13, including means for establishing an initial bias in a closing control direction against the relay means and the counteracting relay means.

15. A system as in claim 13, including means mechanically connecting the relay means and the counteracting relay means, and a biasing spring jointly biasing the connected relay means in closing control direction.

16. In a network system, the combination with a transformer connected to a feeder circuit, and a circuit breaker to connect the transformer to the network, of means for controlling the operation of the circuit breaker to open position and to closed position according to the conditions in the system, said means comprising a balance relay with two magnetizable members mechanically connected and disposed in counteracting relationship, means for applying a positive phase-sequence voltage to one member, means for applying a voltage from the network to the other member while said circuit breaker is in its open position, and means for applying to both members a positive phase-sequence component of the current between the transformer and the network to achieve a directional energy detection through the phase relation between the phase-sequence components of the current and of the voltage, and means controlled by the relay according to the preponderating counteracting member.

17. In an electrical distribution system, a first circuit, a second circuit, connecting means for operatively connecting and disconnecting said circuits, means for transmitting electrical current in said circuits normally in a first direction, means for transmitting electrical current in said circuits under abnormal conditions in a second direction, means for closing said connecting means, tripping means including control means responsive to the direction of current flow in said circuits for tripping said connecting means, and means effective after the connecting means trips only for a predetermined time interval measured from a tripping operation of said connecting means by said tripping means for preventing actuation of said closing means, said preventing means being ineffective for preventing reclosure of said connecting means after the expiration of said time interval.

MYRON A. BOSTWICK.